Nov. 11, 1958  F. E. PAYNE  2,859,988
ROTARY MECHANICAL SEAL
Filed June 20, 1955

*INVENTOR:*
FRANK E. PAYNE
BY
Edward R. Lowndes

United States Patent Office 2,859,988
Patented Nov. 11, 1958

2,859,988

ROTARY MECHANICAL SEAL

Frank E. Payne, Glencoe, Ill., assignor to Crane Packing Company, Chicago, Ill., a corporation of Illinois Application June 20, 1955, Serial No. 516,449

3 Claims. (Cl. 286—11.14)

The improved rotary mechanical seal comprising the present invention has been designed for use primarily in connection with centrifugal pumps which are adapted to operate at fairly high velocities and which are intended to handle corrosive fluids at relatively high temperatures. The invention will also be found useful in other applications as for example in connection with the sealing of openings provided in the walls of tanks or receptacles containing corrosive fluids, one such application being to seal the openings provided in the walls of plating tanks where the supporting shafts for the submerged rolls of the plating equipment pass through these openings. The invention, however, is capable of many other uses and the present improved seal may, if desired, with or without modification, be employed for preventing the leakage of a fluid along a rotating shaft, regardless of the particular installation with which the shaft may be associated.

The provision of efficient sealing means for pumps which handle acid-containing or other corrosive liquids has heretofore presented numerous difficulties, principal among which is that of affording complete obstruction to the passage of liquid along the shaft, this difficulty arising from the use of relatively heavy impellers which are operated at high velocities in the high temperature corrosive liquid. Various seals which have been designed to prevent such leakage of the liquid are short-lived in their operation due to the setting up of an electrolytic action on the various seal parts and particularly upon the sealing elements per se which have running contact each with the other. Where attempts have been made to insulate the running seal parts from the pump housing by the avoidance of direct metal-to-metal contact, the seal has been subject to leakage at the points or regions of insulation. Another difficulty that has been encountered in connection with pumps which handle corrosive fluids has been the lack of resistance to corrosion by the various seal parts which come into contact with the corrosive fluid.

The present invention is designed to overcome the above noted limitations that are attendant upon the use of seals for pumps which handle, or other structures which contain, corrosive fluid and toward this end it contemplates the provision of a rotary mechanical seal in which certain parts thereof, and particularly the main sealing elements which present opposed running sealing surfaces, are effectively insulated from the pump housing or other liquid containing structure with which the seal is associated so that there will be no tendency for an electrolytic action to be set up between these parts with the corrosive fluid constituting the electrolyte which forms a basis for such action.

The provision of a seal of the character briefly outlined above being among the principal objects of the invention, another important object thereof is to provide such a seal wherein the seal elements which present opposed radially disposed running sealing surfaces are disposed outside of the pump housing or other structure containing the corrosive fluid and which therefore are readily accessible for inspection purposes.

Yet another object of the invention is to provide a bearing seal of this character employing a flexible diaphragm member by means of which one of the bearing seal elements is thrust against the other bearing seal element outside of the pump housing and in which the diaphragm member, in addition to performing a sealing function, also constitutes one of the elements by means of which the running sealing members are effectively insulated from the pump housing.

Another object of the invention is to provide a seal of this sort in which the flexible diaphragm member is relieved of torsional strain in that it is not required to receive any torsional thrust from the sealing member with which it is associated.

A still further object of the invention is to provide a rotary mechanical seal possessing the above mentioned characteristics which is of the outside mounted type and which is so designed that it may readily be assembled around the opening provided in the pump housing with a minimum of effort and without requiring disassembly of the pump structure. A similar and related object of the invention is to provide such a seal assembly which may with facility be readily removed from its association with the pump housing and shaft for purposes of inspection of parts, replacement or repair.

A further object of the invention is to provide a rotary mechanical seal having associated therewith novel means whereby the flexible diaphragm employed in connection with the seal may be secured to a sealing washer with which it is associated in effective sealing relationship.

A still further object of the invention is to provide such a seal in which novel means are provided for effectively mounting the sealing seat associated with the seal on the impeller shaft for rotation in unison therewith while at the same time effectively insulating the seat from contact with the shaft. A similar and related object is to provide a novel means for floatingly mounting the sealing seat on the shaft with which it rotates and for floatingly mounting the sealing washer on the pump housing with which it is associated so that these two parts, namely the washer and seat, may be self-aligning for equal distribution of pressures coextensively throughout the running sealing surfaces.

Numerous other objects and advantages of the invention not at this time enumerated will become more readily apparent as the nature of the invention is better understood.

In the accompanying single sheet of drawings, forming a part of this specification, two embodiments of the invention have been shown.

Figure 1:
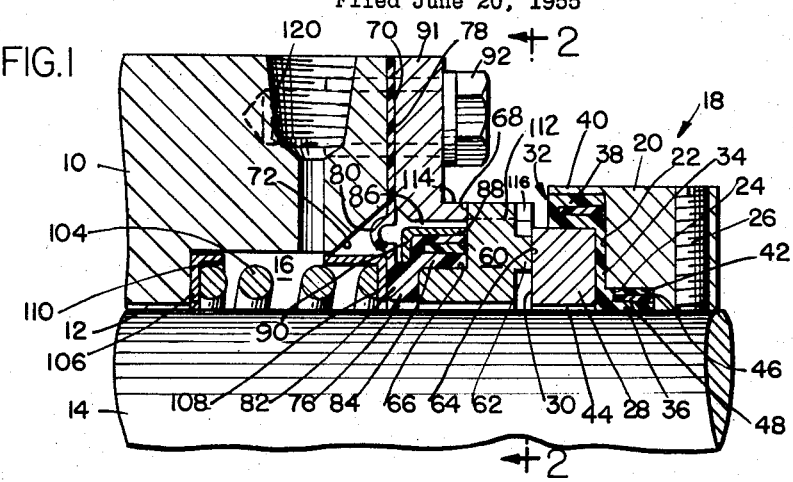
Fig. 1 is a fragmentary sectional view taken substantially centrally through a rotary mechanical seal constructed in accordance with the principles of the present invention and showing the same operatively associated with a pump housing and shaft therefor.

Referring now to the drawings in detail, the improved bearing seal comprising the present invention is shown as being operatively associated with a chemical pump installation capable of handling corrosive materials as for example sodium base liquor and gases at relatively high temperatures. Pumps of this type may vary in the details of their construction according to the particular process involved but in general, and purely for exemplary purposes herein, they will consist of a pump housing, only a fragment of which has been designated herein at 10, having an opening 12 formed therein through which the usual impeller shaft 14 extends. The housing 10 is formed with an outside cavity or recess 16 which constitutes the stuffing box in which the present seal assembly is adapted to be at least partially installed in order to effectively seal the corrosive fluid from egress through the opening 12 to the atmosphere.

As clearly shown in Fig. 1, the present seal assembly is of the outside type, which is to say the constituent parts thereof are situated on the outside of the housing 10 where they are conveniently accessible for purposes of inspection or replacement of parts. The seal involves in its general organization a sealing washer assembly designated in its entirety at 18 which is affixed to and designed for rotation in unison with the shaft 14. This seat assembly includes a seat holder or retainer 20 which may be in the form of a metal ring having an enlarged recess 22 formed in the rear side thereof and an undercut recess 24 on the inside thereof. The body portion is adapted to be secured to the shaft 14 by means of a set screw 26. The seal seat proper is in the form of a ring 28 having a rearwardly facing flat radial sealing surface 30 formed thereon. The seat 28 is nested within the recess 22 provided in the holder 20 and is floatingly held in position in this recess by means of a yieldable resilient ring 32 which is preferably formed of a material such as polytetrafluoroethylene which possesses in a marked degree resistance to the corrosive effects of practically all chemicals and chemical solutions. One material that has been found particularly effective for the construction of the ring 32 is the polytetrafluoroethylene polymer which is manufactured and sold by E. I. du Pont de Nemours & Co. by the trade name "Teflon." This material is characterized by its chemical inertness which is characteristic from extremely low temperatures through temperatures ranging up to 752° F. In this temperature range it resists the attack of corrosive reagents and dissolution by solvents. The ring 32 may be molded from the material known as "Teflon" so as to provide a radial wall 34 from which there projects laterally and rearwardly at its inner edge a thickened flange 36. The outer edge of the ring 32 is formed with a forwardly extending thickened flange 38 capable of being nested within the cylindrical wall 40 provided in the seal holder 20 by virtue of the recess 22. The thickened flange 36 extends into the undercut recess 24 and is compressed between the wall 42 of this undercut recess and the cylindrical surface of the shaft 14 so that the ring 32 is thus preloaded upon the shaft.

The seat proper 28 has an outside diameter which is somewhat greater than the inside dimension of the laterally extending flange 38 so that when the seat is telescopically received within this latter resilient flange, the flange is compressed between the outside surface of the seat 28 and the inner cylindrical surface of the wall 40. The inside diameter of the seat 28 is slightly greater than the diameter of the shaft 14 so that a slight clearance exists as at 44 between these parts and so that the seat is thus floatingly nested within the seat holder 20.

Figure 4:
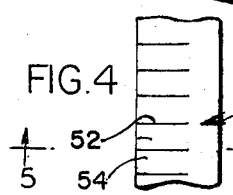
Fig. 4 is a fragmentary plan view of a sealing ring capable of alternative use in connection with the present invention.
Figure 5:
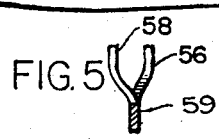
Fig. 5 is a sectional view taken substantially along line 5—5 of Fig. 4.

The preloading of the flange 36 upon the shaft 14 is enhanced by the provision of a circumferentially extending groove 46 which is formed in the laterally turned portion 36 of the resilient ring 32 and which extends completely therearound. Inserted within this groove 46 is a wedge member 48 which may assume any one of a number of different forms. Because of the fact that the material "Teflon," although it possesses a certain degree of resiliency, is slow to return to its original dimensions after having once been deformed, the wedge member 48 is designed to supply a more immediately effective degree of resiliency to the flange 36 as a whole. Accordingly, this wedge member may be formed of resilient rubber so that when the flange is compressed between the surface 42 and the shaft 14 it will spread the relatively thin lips on the opposite sides of the groove 46 apart and into engagement with the respective surfaces against which they bear. The wedge member may also assume the form of a spring spreader device such as has been shown in Figs. 4 and 5. This device, which has been designated in its entirety at 50, is in the form of a metal ring or band having a width substantially equal to the depth of the groove 46 and which has been slotted inwardly at equally spaced regions 52 therearound to provide a series of contiguous fingers or tines 54, alternate tines being bent out of the cylindrical confines of the band in opposite directions as shown at 56 and 58 in Fig. 5. The base portion of the ring or band 50 is inserted into the groove 46 and when the flange 36 is preloaded between the holder 20 and shaft 14 the various tines 54 will tend to flatten out but they will exert an oppositely directed force on the lips on opposite sides of the groove 46 and effect a sealing action between the holder and shaft.

The laterally extending flange 38 of the resilient ring 32 may also be grooved in the manner of the flange 36 and a similar wedge element installed within the groove. Accordingly, to avoid needless repetition of description, similar characters of reference have been applied to the groove and wedge member associated with the flange 38.

The seat assembly 18 is designed for cooperation with a sealing washer 60 which surrounds the shaft 14 and which is provided with a forwardly extending rib or nose piece 62 having a flat lapped surface 64 designed for running sealing engagement with the similarly lapped flat surface 30 provided on the seat proper 28. The washer is formed with a rearwardly facing recess providing a cylindrical surface 66 and a radially disposed shoulder 68. The materials selected for the washer 60 and its cooperating seat 28 will be chosen according to engineering exigencies to accommodate the particular corrosive or other liquid handled by the pump assembly. Where noncorrosive or mildly corrosive liquids are contemplated the seat 28 may be formed of cast iron and the washer 60 may be formed of a thermo setting resin containing a powdered alloy of antimony, tin and lead and it has been found that washers of such material are highly effective when operating against either cast iron or a ceramic material. Where corrosive fluids are undergoing pumping, the seat may be formed of ceramic material while the washer may be formed of powdered compressed "Teflon" which has been mixed with powdered glass. Irrespective however of the particular materials employed for either the washer or the seat, the essential features of the present invention will at all times be preserved.

In order to seal the washer 60 to the housing 10, the latter is formed with a flat forwardly presented surface 70 surrounding the recess or stuffing box 16 and this surface 70 merges with the wall of the recess through a frusto-conical surface 72 extending between the flat surface 70 and washer 60 and in sealing relation with both parts is a flexible diaphragm 76 which is formed of a material which is not affected by corrosive reagents and which may be the aforementioned material "Teflon." The diaphragm 76 is provided with a radial peripheral region 78 which is connected through a diaphragm fold 80 to a central or hub portion 82 of greater thickness than the peripheral portion 78. Extending forwardly from the outer region of the hub portion 82 is a laterally extending flange portion 84 which likewise is of considerable thickness. The hub portion 82 is adapted to bear forwardly against the rear face of the washer 60 while the forwardly extending flange portion 84 is adapted to seat within the recess provided in the rear face of the washer so that it bears on the cylindrical surface 66 and also against the rearwardly facing surface 68 to thus partially fill the void created by the recess in the washer. The flange 84 is adapted to be preloaded upon the surface 66 by means of a metal ferrule 86 having a cylindrical portion 88 and a radial portion 90 both of which portions fit closely around two sides of the flange 84. The ferrule 86 assists in preloading the flange 84 against the cylindrical surface 66.

The forwardly extending flange 84 may be similar in its design and construction to the flanges 36 and 38 associated with the flexible ring 32 and toward this end it may be grooved to receive an expansion ring such as has been described in connection with the flanges 36 and 38. Here again, the utilization of corresponding reference numerals has been resorted to to avoid needless repetition of description.

The radially extending peripheral portion 78 of the diaphragm 76 is adapted to be clamped against the radial surface 70 on the housing 10 in substantially coextensive face-to-face relationship much in the manner that the gasket is adapted to be clamped in position and toward this end a clamping retainer 91 of circular design is provided and is adapted to be secured against the forward face of the diaphragm by means of a series of clamping studs 92 of any desired number, provision for four such studs being made in the present disclosure. The ends of the studs are threadedly received as at 94 in threaded holes 96 drilled in the housing and each stud 92 is preferably shielded by a tubular sleeve of "Teflon" 98 which is flanged at 100 and which passes through holes 102 suitably spaced around the peripheral regions of the diaphragm 76. The "Teflon" sleeves are provided for the purpose of shielding the studs from contact with the pump so that no electrolytic action will be set up either in the vicinity of the studs or in the vicinity of the running seal surfaces 30 and 64 which are thus electrically insulated from the housing 10 by virtue of the "Teflon" sleeves 98 and "Teflon" diaphragm 76.

The washer 60 is axially movable along the shaft 14 and means are provided for normally urging the washer in a forward direction against the seat 28 to take up for any wear that may occur on the nose piece 62. Toward this end a compression spring 104, which seats at its opposite ends in spring retainers 106 and 108 respectively, surrounds the shaft 14, is disposed within the recess or stuffing box 16 and effectively bears at one end against the rear wall 110 of the recess and at its other end against the forward face of the hub portion 82 of the diaphragm 76. The spring retainers 106 and 108 are each of cup-shaped configuration and the forward retainer 108 bears forwardly against the hub portion 82 under the expansive influence of the spring 104.

Figure 2:
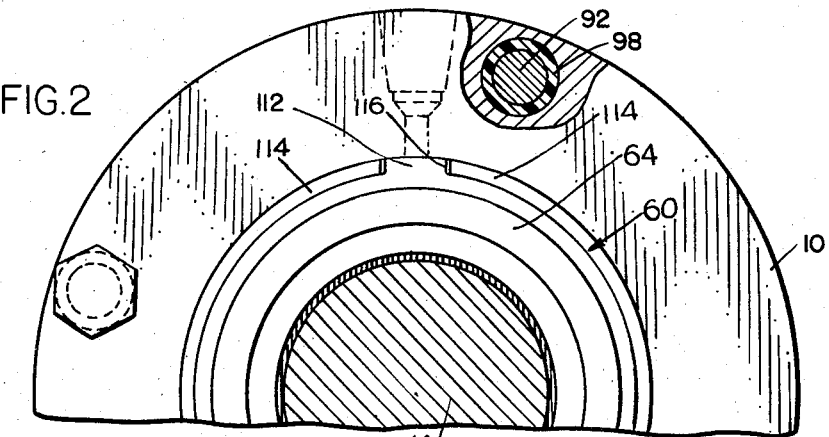
Fig. 2 is a sectional view taken substantially along the line 2—2 of Fig. 1.

As shown in Fig. 2, the sealing washer 60 is provided with a series of radially outwardly extending ribs 112 and the retainer 90 is provided with a forwardly extending flange 114 which is notched as at 116 to receive the ribs 112 in interlocking relationship so as to effect an anti-torque connection with the washer 60 to prevent the rotary movement of the seat 28 from being transmitted to the washer.

In order to insure adequate lubrication of the seal surfaces, a conventional bypass opening is shown at 120. This bypass opening communicates with the interior of the stuffing box 16 and is adapted to be connected through a suitable conduit and fittings (not shown) with the pressure side of the pump. The provision of the bypass opening 120 establishes a circulatory path for the pumpage extending from the pump through the bypass connection, stuffing box, and the clearance which extends between the shaft 14 and wall of the opening 12 through which it extends.

Figure 3:
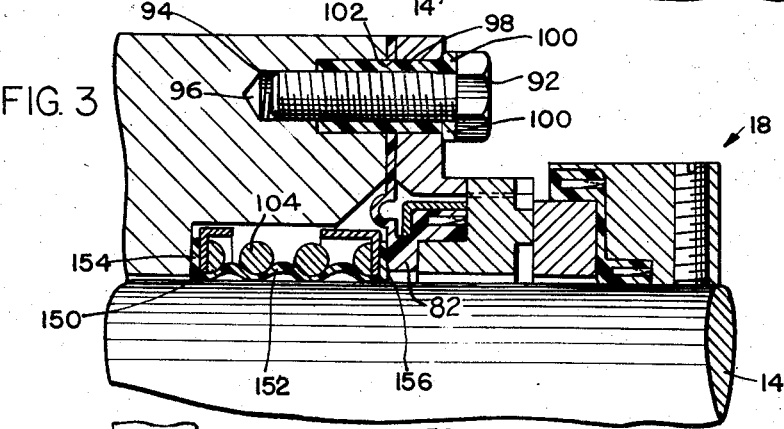
Fig. 3 is a sectional view similar to Fig. 1 showing a slightly modified form of the invention.

In certain installations it may be desirable that the spring 104 be effectively insulated from the corrosive pumpage and in such an instance the modified structure shown in Fig. 3 may be employed. In this form of the invention all of the essential parts of the seal assembly remain substantially the same as in the form of the invention shown in Figs. 1 and 2 and accordingly, to avoid needless repetition of description it is deemed sufficient that corresponding reference numerals be applied to the corresponding parts in both Fig. 1 and Fig. 3. In this latter form of the invention an insulating sleeve 150 is employed to insulate the spring 104 and its seating ferrules 106, 108. The sleeve has a central tubular region 152 which may be caused to hug the convolutions of the spring 104 and a pair of end flanges 154 and 156. The flange 154 extends between the spring retainer 106 and the end wall 110 of the stuffing box 16 while the flange 156 extends between the spring retainer 108 and the rear face of the diaphragm hub 82 and these two flanges are clamped between the respective parts against which they bear under the influence of the spring 104. With the exception of the insulating sleeve 150 employed in connection with the form of the invention shown in Fig. 3, the essential features of the invention remain substantially the same as heretofore described in connection with the seal of Figs. 1 and 2.

In connection with the construction of the flexible diaphragm 76 and the resilient ring 32, these two parts are preferably machined by a special process, which forms no part of this invention, from a solid tubular piece of "Teflon" stock inasmuch as the material known as "Teflon" is not readily susceptible to molding operations of the character necessary to produce the sharp corners involved for mating contact with the relatively sharp corners on the washer 60 and seat assembly 18.

The invention is not to be limited to the exact arrangement of parts shown in the accompanying drawing or described in this specification as various changes in the details of construction may be resorted to without departing from the spirit of the invention. For example, while the medial regions of the "Teflon" diaphragm 76 has been shown with a single diaphragm fold 80, it is obvious that additional folds may be provided to lend greater flexibility to the diaphragm as a whole. If desired, the fold 80 may be completely eliminated although possibly at the sacrifice of some flexibility. Similarly, while various wedge members 48 have been described in the form shown in Figs. 4 and 5 as constituting slitted ring members biased to produce the desired spreading action, other types of wedge members as for example sinous piston ring type members are contemplated. Only insofar as the invention has been particularly pointed out in the accompanying claims is the same to be limited.

What I claim is:

1. In a seal assembly for a shaft and a housing surrounding the same, an annular sealing washer adapted to be telescopically received over the shaft, said washer being formed of a rigid noncompressible material and having a forwardly facing radially disposed running sealing surface adapted to frictionally bear against a radial surface substantially normal to the shaft and movable with the latter, said washer being formed with an annular recess providing a rearwardly facing radially disposed shoulder and a substantially cylindrical surface rearwardly of said shoulder, a flexible sealing sleeve having a body portion and a forwardly extending cylindrical portion, means for sealing said body portion to said housing, said sleeve being telescopically received over said sealing washer with said forwardly extending portion surrounding said cylindrical surface, there being a circumferential rearwardly extending continuous slit formed in the forward edge of the cylindrical portion of said sleeve, a rigid clamping ring telescopically received over said cylindrical portion of the sleeve and serving to preload said latter portion on the cylindrical surface of said washer, and resilient expansion means disposed within said slit and extending continuously therearound and serving to spread the walls of said slit outwardly against said rigid clamping ring and inwardly against the cylindrical surface of the washer to assist said ring in its preloading function.

2. The combination with a rotary shaft, of a seat assembly for a rotary mechanical seal telescopically received over said shaft and secured thereto for rotation in unison therewith, said assembly comprising in combination a seat proper in the form of a ring of non-compressible material having a substantially flat sealing surface, a metal retainer of cup-shaped configuration having a central bore immediately surrounding said shaft, a first counterbore providing in combination with said shaft a first cup recess and a second counterbore providing in combination with said shaft a second cup recess, said seat proper being telescopically received within said second cup recess, a resilient ring disposed within said cup-shaped retainer and having a laterally turned forwardly extending thickened portion at its inner periphery substantially filling said first cup recess and a laterally turned rearwardly extending portion at its outer periphery surrounding said seat proper and within which the latter is closely nested, said last mentioned laterally turned thickened portion together with said seat proper substantially filling said second cup recess and an interconnecting portion extending between said thickened portions and interposed between the seat proper and a rearwardly facing surface on the retainer.

3. In a rotary mechanical seal, the combination set forth in claim 2 in which each of said thickened portions of the resilient ring is formed with a continuous annular slit extending inwardly from one edge thereof, and resilient means disposed within each of said slits serving to spread the walls thereof radially apart.

References Cited in the file of this patent

UNITED STATES PATENTS

| 420,391 | Rice | Jan. 28, 1890 |
| 1,618,333 | Green | Feb. 22, 1927 |
| 2,419,588 | Pasco | Apr. 29, 1947 |

FOREIGN PATENTS

| 558,576 | Great Britain | Jan. 11, 1944 |